US006972068B1

(12) United States Patent
Kobayashi et al.

(10) Patent No.: US 6,972,068 B1
(45) Date of Patent: Dec. 6, 2005

(54) METHOD FOR THE SURFACE TREATMENT OF A FLUORINE RESIN, METHOD FOR MAKING A LAMINATE, AND A LAMINATE

(75) Inventors: Taichi Kobayashi, Kodaira (JP); Masato Yoshikawa, Kodaira (JP); Shinji Saitoh, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 146 days.

(21) Appl. No.: 09/698,219

(22) Filed: Oct. 30, 2000

(30) Foreign Application Priority Data

| Oct. 28, 1999 | (JP) | 11-306253 |
| Oct. 28, 1999 | (JP) | 11-306254 |
| Oct. 28, 1999 | (JP) | 11-306255 |
| Oct. 28, 1999 | (JP) | 11-306256 |

(51) Int. Cl.$^7$ ............................................. B32B 31/00
(52) U.S. Cl. .................. 156/272.6; 264/446; 264/483
(58) Field of Search ................... 264/469, 446, 264/483; 156/272.6, 272.2, 273.3, 274.4, 156/379.6, 380.9; 427/533, 535, 540, 569

(56) References Cited

U.S. PATENT DOCUMENTS

| 3,030,290 A | * | 4/1962 | Ryan ..................... 156/272.6 |
| 3,296,011 A | | 1/1967 | McBride et al. |
| 3,627,624 A | | 12/1971 | Kreuz et al. |
| 4,594,262 A | * | 6/1986 | Kreil et al. .................. 427/551 |
| 4,622,237 A | | 11/1986 | Lori |
| 4,910,258 A | | 3/1990 | Inoue et al. |
| 5,051,586 A | * | 9/1991 | Sabreen ...................... 264/446 |
| 5,229,172 A | | 7/1993 | Cahalan et al. |
| 5,466,424 A | * | 11/1995 | Kusano et al. .......... 422/186.05 |
| 5,662,972 A | * | 9/1997 | Shimada et al. ............ 428/35.7 |
| 5,958,532 A | * | 9/1999 | Krause et al. ............ 156/272.6 |
| 6,046,403 A | * | 4/2000 | Yoshikawa et al. .......... 136/257 |
| 6,165,575 A | * | 12/2000 | Nishi et al. ................ 428/36.9 |
| 6,307,145 B1 | * | 10/2001 | Kataoka et al. .............. 136/251 |

FOREIGN PATENT DOCUMENTS

| DE | 1 290 717 | 3/1969 |
| EP | 0 479 592 A2 | 4/1992 |

(Continued)

OTHER PUBLICATIONS

"Condensed Chemical Dictionary" (CCD) Except, p. 362, ©1977.*

(Continued)

Primary Examiner—Jeff H. Aftergut
Assistant Examiner—John L. Goff
(74) Attorney, Agent, or Firm—Sughrue Mion, PLLC (57) ABSTRACT

The invention relates to a laminate, which has at least a portion where a fluorine resin and a crosslinking elastic adhesive body such as of an ethylene-vinyl acetate copolymer or the like are directly bonded together and which is used as a window material of buildings or mainly used as an outdoor electric member and also to a method for making the laminate. More particularly, the invention provides a surface-treating method of a fluorine resin suited to impart bonding properties to a fluorine resin for the laminate, to a laminate having a good property of bonding between the fluorine resin and the crosslinking elastic adhesive body, and also to a method for making such a laminate as mentioned above.

4 Claims, 2 Drawing Sheets

FOREIGN PATENT DOCUMENTS

| | | |
|---|---|---|
| EP | 0 597 120 A1 | 5/1994 |
| EP | 0 755 080 A2 | 1/1997 |
| EP | 0 823 644 A2 | 2/1998 |
| EP | 0 860 886 A2 | 8/1998 |
| EP | 0 939 441 A2 | 9/1999 |
| JP | 11-10807 | 1/1999 |
| JP | 11-222530 | 8/1999 |
| WO | 99/53994 | 10/1999 |

OTHER PUBLICATIONS

Database WPI, Section Ch, Week 199442, Derwent Publications Ltd., London, GB; AN 1994-338434, XP002162493 & JP 06 263949 A (Toray IND INC), Sep. 20, 1994, *abstract*.

European Search Report.

* cited by examiner

METHOD FOR THE SURFACE TREATMENT OF A FLUORINE RESIN, METHOD FOR MAKING A LAMINATE, AND A LAMINATE

BACKGROUND OF THE INVENTION

This invention relates to a laminate, which has, at least at a part thereof, a portion where a fluorine resin and a crosslinking elastic adhesive body, such as of an ethylene-vinyl acetate copolymer or the like, are directly bonded to each other and which is adapted for use as a window material for buildings and an electric member mainly for outdoor use and also, to a method for making such a laminate. More particularly, the invention relates to a method for the surface treatment of a fluorine resin, which is suited to impart bonding properties to a fluorine resin for the laminate, a laminate having an excellent property of bonding between the fluorine resin and the crosslinking elastic adhesive body, and a method for making such a laminate as mentioned above.

The laminate obtained by directly bonding, to a fluorine resin, a crosslinking elastic adhesive body, such as of an ethylene-vinyl acetate copolymer (EVA) or the like, is used by bonding to the surface of a building material or a solar cell for surface protection, impartment of a stain resistance, sealing and the like.

In this case, the performance of bonding between the fluorine resin and the crosslinking elastic adhesive body required in view of an applied environment includes, aside from storage stability, a heat resistance after bonding via crosslinkage and weatherability such as a resistance to ultraviolet light.

To ensure strong bonding with a crosslinking elastic adhesive body, the fluorine resin is subjected to a variety of surface treatments prior to the bonding. As the surface treatment method, there are known a sodium treatment, a sand blast treatment, a flame treatment, a corona treatment, a plasma treatment, a sputter etching treatment, a radiation irradiation treatment, and the like. Of these, the corona treatment is able to produce, on the fluorine resin surface, various types of functional groups that contribute to imparting good bonding properties thereto and is thus known as an effective treating method.

However, the fluorine resin surface treated by these treating methods may be unsatisfactory, in some cases, with respect to its bonding force, thus the best use being not made of the surface-treating effect at present.

On the other hand, with regard to the crosslinking elastic adhesive body, an attempt has been made to formulate a silane coupling agent for the purpose of improving the quality of the resin.

However, the present inventor has found that the crosslinking elastic adhesive body formulated with a silane coupling agent is disadvantageous in that its properties of bonding to the surface-treated fluorine resin are poor. Accordingly, there is a demand of solving this problem.

SUMMARY OF THE INVENTION

Under these circumstances in the art, the present invention has for its first object the provision of a method for the surface treatment of a fluorine resin, which is suitable for reliably making a laminate obtained by direct and strong bonding between a fluorine resin and a crosslinking elastic adhesive body, such as of an ethylene-vinyl acetate copolymer or the like, and also a method for making a laminate. The invention has as its second object the provision of a laminate in which a fluorine resin and a crosslinking elastic adhesive body, such as of an ethylene-vinyl acetate copolymer or the like, are directly, strongly bonded together and which is excellent in initial bonding property and storage stability, and also of a method for making the laminate.

To achieve the above objects, the present inventor has made intensive studies, and as a result, found, as a measure for achieving the first object, methods (1) to (3) set out below, a fluorine resin treated by the methods, and a method for making a laminate having the fluorine resin therein.

(1) A method for the surface treatment of a fluorine resin wherein the surface of the resin has an absorbance at 360 nm of not smaller than $0.02/100$ $cm^2$ when measured by iodometry.

(2) A method for subjecting a fluorine resin surface to corona discharge treatment in an atmosphere of a nitrogen gas while controlling the concentration of an oxygen gas to 4 to 150 ppm.

(3) A method for carrying out a thermal treatment after having subjected a fluorine resin surface to corona discharge treatment in air.

With respect to the method (1), there have been initially investigated acidic or reductive functional groups and radical-generating function groups (a diazo group, a peroxide and the like) that are produced on the surface treatment of a fluorine resin. As an index indicating strong bond with a crosslinking elastic adhesive body upon crosslinkage, there has been studied a peak of $I_3^-$ detected at 360 nm in an iodometric method evidencing the existence of the functional groups (i.e. a method set out in known literature including "Chemistry of Organic Peroxides", edited and written by Yoshiro Ogata, Nanko-Do p. 331 (1971), Jane E. Flew, et al., Analytica Chimica Acta, 155, p. 139 (1983), Organic Synthetic Chemistry, by Masayuki Yoshida, 27. P. 257 (1969), etc).

As a consequence, it has been found that a fluorine resin, which is so treated that its absorbance at 360 nm is detected as a value of $0.02/100$ $cm^2$ or over, preferably $0.03/100$ $cm^2$ or over, is excellent in the bonding property as a whole. When the thus treated fluorine resin and a crosslinking elastic adhesive body, such as of an ethylene-vinyl acetate copolymer or the like, are directly laminated with each other and integrally combined together. In this way, the fluorine resin and the crosslinking elastic adhesive body are bonded strongly, thereby making it possible to reliably make a laminate that is required of storage stability, a surface protecting property, a stain resistance, a high transparency and a member-sealing property.

As for the method (2), it has been found that when a fluorine resin is subjected to corona discharge treatment in a nitrogen gas while controlling the concentration of an oxygen gas in the nitrogen gas at 4 to 150 ppm, the property of bonding between the fluorine resin and the crosslinking elastic adhesive body and storage stability are drastically improved. Moreover, when the crosslinking elastic adhesive body, such as of an ethylene-vinyl acetate copolymer or the like, is directly laminated and integrally combined with the fluorine resin surface-treated under the oxygen concentration conditions, the fluorine resin and the crosslinking elastic adhesive body are strongly bonded together, thus making it possible to reliably produce a laminate that is excellent in storage stability and has good properties such as a surface protecting property, a stain resistance, a high transparency, a member-sealing property and the like.

With respect to the method (3), it has been found that a fluorine resin is subjected to corona discharge treatment in air and is subsequently thermally treated, thereby improving the property of bonding with the crosslinking elastic adhesive body. In addition, when the thus treated fluorine resin is directly laminated to and integrally combined with a crosslinking elastic adhesive body, such as of an ethylene-vinyl acetate copolymer or the like, the fluorine resin and the crosslinking elastic adhesive body are bonded together to reliably obtain a laminate that is demanded to have various properties such as a stain resistance, a high transparency, sealing properties and the like.

Further, the present inventor has made studies on a laminate and a method for making the laminate to achieve the second object.

More particularly, it has been found that when a laminate obtained by directly bonding a crosslinking elastic adhesive body, such as an ethylene-vinyl acetate copolymer (EVA) or the like, to a fluorine resin, is so arranged as to formulate a silane coupling agent in the crosslinking elastic adhesive body, the quality of the crosslinking elastic adhesive body is improved. However, the silane coupling agent impedes the bonding property. Especially, the addition of the silane coupling agent causes the bonding property with the fluorine resin surface, subjected to surface-treatment with a corona discharge treatment or the like, to be impeded.

Further studies reveal that when the crosslinking elastic adhesive body is so arranged as to have at least a double-layered structure including a first layer, which is substantially free of a silane coupling agent and its content is limited to within a range of 0 to less than 0.1 wt %, and a second layer having a predetermined amount of a silane coupling agent. In this arrangement, the first layer is directly bonded to a fluorine resin, and the second layer is directly attached or laminated to the first layer. In this way, the fluorine resin, and the first crosslinking elastic adhesive layer or body and the second crosslinking elastic adhesive layer or body are, respectively, strongly bonded together. The resultant laminate satisfactorily meets the requirement in improved quality of the crosslinking elastic adhesive body, and thus has excellent bonding properties such as an initial bonding force and storage stability. In addition, the laminate also meets the requirement for surface protecting property, stain resistance, high transparency and member-sealing property.

The invention has been accomplished based on these findings.

A surface-treating method of a fluorine resin, a method for making a laminate, and a laminate according to the embodiments of the invention are summarized below.

According to one embodiment of the invention, there is provided a method for surface-treating a fluorine resin, which comprises surface-treating a surface of a fluorine resin sheet so that the surface has an absorbance at 360 nm of not lower than $0.02/100$ $cm^2$ when determined by iodometry. The absorbance is preferably at $0.03/100$ $cm^2$ or over.

The surface treatment is preferably carried out by corona discharge treatment of the fluorine resin surface while controlling a concentration of an oxygen gas at 4 to 150 ppm in a nitrogen gas atmosphere. In this case, the oxygen gas concentration is preferably in the range of 4 to 50 ppm.

According to another embodiment of the invention, there is also provided a method for surface-treating a fluorine resin, which comprises subjecting a surface of a fluorine resin to corona discharge treatment in air, and thermally treating the thus treated resin.

The thermal treatment is preferably carried out at a temperature of 80 to 300° C. for 5 to 60 minutes. In all the embodiments set out above, the fluorine resin consists of an ethylene-tetrafluoroethylene copolymer.

According to a further embodiment of the invention, there is provided a method for making a laminate wherein a fluorine resin and a crosslinking elastic adhesive body are directly bonded together, which method comprising laminating the crosslinking elastic adhesive body to a fluorine resin surface, which has been treated according to one of the following methods (1) to (3):

(1) the fluorine resin surface is so treated that its absorbance at 360 nm is $0.02/100$ $cm^2$ or over when determined by iodometry;

(2) the fluorine resin surface is treated with corona discharge in an atmosphere of a nitrogen gas while controlling a concentration of an oxygen gas in the range of 4 to 150 ppm; and (3) the fluorine resin surface is treated with corona discharge in air and subsequently thermally treated.

In this embodiment, it is preferred that after having laminated with the fluorine resin, the crosslinking elastic adhesive body is crosslinked. In this case, the crosslinking elastic adhesive body is crosslinked by use of a radical initiator. Moreover, it is preferred that the crosslinking elastic adhesive body comprises, as its main component, an ethylene-vinyl acetate copolymer.

According to a still further embodiment of the invention, there is provided a laminate of the type which comprises a fluorine resin and a crosslinking elastic adhesive body are directly bonded together, wherein the crosslinking elastic adhesive body has a structure including a first crosslinking adhesive body having a content of a silane coupling agent ranging from 0 to less than 0.1 wt % and a second crosslinking elastic adhesive body formulated with a silane coupling agent, and the fluorine resin is directly bonded to one side of the first crosslinking elastic adhesive body and the second crosslinking elastic adhesive layer is directly bonded to the other side.

The amount of the silane coupling agent in the second crosslinking elastic adhesive layer should preferably be in the range of 0.1 to 20 wt %. It is preferred that the fluorine resin is surface treated. For the surface treatment, corona discharge may be employed.

The fluorine resin may be surface-treated by one of the following methods (1) to (3):

(1) the fluorine resin surface is so treated that its absorbance at 360 nm is $0.02/100$ $cm^2$ or over when determined by iodometry;

(2) the fluorine resin surface is treated with corona discharge in an atmosphere of a nitrogen while controlling a concentration of an oxygen gas in the range of 4 to 150 ppm; and (3) the fluorine resin surface is treated with corona discharge in air and subsequently thermally treated.

Further, the first crosslinking elastic adhesive layer is preferably crosslinked by use of a radical initiator. In addition, the first crosslinking elastic adhesive layer comprises, as its main component, an ethylene-vinyl acetate copolymer. Likewise, the second crosslinking elastic adhesive layer is preferably crosslinked with a radical initiator, and may be made mainly of an ethylene-vinyl acetate copolymer.

Moreover, the fluorine resin used should preferably consist of an ethylene-tetrafluoroethylene copolymer.

According to another embodiment of the invention, there is provided a method for making a laminate of the type wherein a fluorine resin and a crosslinking elastic adhesive body are directly bonded together, wherein a first crosslinking elastic adhesive body having a content of a silane coupling agent of 0 to less than 0.1 wt % is laminated at one side thereof with the fluorine resin, and a second crosslinking adhesive body formulated with a silane coupling agent is laminated with the other side of the first layer.

In the method, it is preferred that, after the lamination of the first and second crosslinking, elastic adhesive bodies to the fluorine resin, the adhesive layers are crosslinked. The fluorine resin used in this method is surface-treated. Preferably, the fluorine resin is treated with corona discharge.

The fluorine resin may be surface-treated by one of the following methods (1) to (3):
(1) the fluorine resin surface is so treated that its absorbance at 360 nm is 0.02/100 $cm^2$ or over when determined by iodometry;
(2) the fluorine resin surface is treated with corona discharge while controlling a concentration of an oxygen gas in an atmosphere of nitrogen gas in the range of 4 to 150 ppm; and
(3) the fluorine resin surface is treated with corona discharge in air and subsequently thermally treated; and the surface-treated fluorine resin is laminated with the first and second crosslinking elastic adhesive bodies and integrally combined.

It is preferred that the content of the silane coupling agent in the second crosslinking elastic adhesive body ranges from 0.1 to 20 wt % and that the first crosslinking elastic layer is crosslinked with a radical initiator. Moreover, the first crosslinking elastic layer may be made mainly of an ethylene-vinyl acetate copolymer. In addition, the second crosslinking elastic layer is preferably crosslinked with a radical initiator, and the second crosslinking elastic layer may be made mainly of an ethylene-vinyl acetate copolymer. The fluorine resin used in this method is preferably made of an ethylene-tetrafluoroethylene copolymer.

DETAILED EMBODIMENTS OF THE INVENTION

The invention is now described in detail. The surface-treating method of a fluorine resin, which is a measure for achieving the first object of the invention, is a surface treatment for strongly bonding a fluorine resin and a crosslinking elastic adhesive body. The fluorine resin is treated by one of the following methods (1) to (3):
(1) a surface-treating method wherein the fluorine resin surface is treated so that its absorbance at 360 nm is at 0.02/100 $cm^2$ or over when determined by iodometry;
(2) a method wherein the fluorine surface treatment is subjected to corona discharge treatment while controlling a concentration of an oxygen gas in an atmosphere of nitrogen gas ranges from 4 to 150 ppm; and
(3) a method wherein the fluorine resin surface is treated with corona discharge in air and subsequently thermally treated.

The fluorine resin treated according to one of the methods (1) to (3) is not critical in type and includes, for example, polytetrafluoroethylene (PTFE), tetrafluoroethylene-hexafluoropropylene copolymer (FEP), tetrafluoroethylene-perfloroalkylvinyl ether copolymer (PFA), polychlorotrifluoroethylene (PCTFE), polyvinylidene fluoride (PVDF), polyvinyl fluoride (PVF), ethylene-tetrafluoroethylene copolymer (ETFE), ethylene-chlorotrifluoroethylene copolymer (ECTFE), and the like. These may be appropriately selected depending on the end use of the laminate using a treated fluorine resin.

In the practice of the invention, it is preferred to use an ethylene-tetrafluoroethylene copolymer, which is thermoplastic in nature and is excellent in moldability, heat resistance, resistance to chemicals, electric characteristics (dielectric characteristic), non-adhesiveness, abrasion resistance, cut-through resistance, radial ray resistance, UV transmission, IR absorptivity and the balance of these characteristic properties. Accordingly, the copolymer can be conveniently used as a surface material for outdoor electric members.

To optimize the property of bonding to a crosslinking elastic adhesive body, the surface-treating method (1) of a fluorine resin according to the invention comprises treating the fluorine resin in such a way that its absorbance is 0.02/100 $cm^2$ or over when determined by iodometry.

In the treating method (1), the absorbance at 360 nm, at which a peak of $I_3^-$ is obtained at the surface thereof according to an iodometric method, is adopted as an index indicating the quantity of radical-generating functional groups (an azo group, a peroxide), and the absorbance should be 0.02/100 $cm^2$ or over, preferably 0.03/100 $cm^2$ or over. If the absorbance if less than 0.02/100 $cm^2$, the amount of the radical-generating functional groups is too small to impart satisfactory bonding to a crosslinking elastic adhesive body.

The above measuring method may be ones that are set out in the afore-mentioned known literature ("Chemistry of Organic Peroxides", edited and written by Yoshiro Ogata, Nanko-Do p. 331 (1971), Jane E. Flew, et al., Analytica Chimica Acta, 155, p. 139 (1983), Organic Synthetic Chemistry, by Masayuki Yoshida, 27. P. 257 (1969), etc).

In the present invention, so far as such an absorbance as defined above at the surface of the fluorine resin is ensured, there may be used various surface-treating methods including, for example, corona treatment, flame treatment, low pressure plasma treatment, atmospheric pressure plasma treatment, UV irradiation treatment, laser irradiation treatment, electron beam irradiation treatment, radiation irradiation treatment and the like. In the practice of the invention, the corona treatment is preferred.

The corona treatment may be one that is known in the art and includes a method, which is carried out in an atmosphere of nitrogen gas at a low concentration of oxygen gas. For reducing the concentration of oxygen gas to a low level, mention is made of methods including a method, in which a gas other than oxygen gas is blown at an atmospheric pressure at a portion where a corona discharge takes place, a method, in which a corona discharge portion is covered such as with a polymer sheet, and after sealing, an inner gas is replaced by a gas other than oxygen, and a combination thereof. Gases other than oxygen include nitrogen, argon, carbon dioxide, helium, tetrafluoromethane and the like, of which nitrogen gas is preferred because of its inexpensiveness with no danger. It will be noted that the oxygen concentration can be measured, for example, by a galvanic cell type densitometer.

According to the method of (1), the fluorine resin can be surface-treated so as to ensure direct, strong bonding to a crosslinking elastic adhesive body.

Next, the treating method (2) is one wherein a fluorine resin can be strongly bonded to a crosslinking elastic adhesive body and is imparted with a good bonding property along with good storage stability.

In the treating method (2) of the invention, when the fluorine resin is subjected to corona discharge treating under given conditions, it is necessary to control a concentration of an oxygen gas in a nitrogen gas atmosphere at a given very low level. The oxygen concentration is generally in the range of 4 to 150 ppm, preferably 4 to 100 ppm, and more preferably 4 to 50 ppm. If the oxygen concentration is less than in the above range, storage stability becomes worsened when a laminate is fabricated. On the other hand, when the concentration exceeds the range, an initial bonding force considerably lowers.

The procedure of controlling the oxygen gas concentration at a very low level includes those methods including, for example, a method, in which a nitrogen gas is blown, at an atmospheric pressure, against a portion where corona discharge takes place, a method, in which a corona discharge portion is covered with a polymer sheet or the like, and after sealing, an inner gas is replaced by nitrogen gas, and a combination thereof. Gases other than oxygen are limited to nitrogen gas, and the treatment can be carried out inexpensively without involving a danger. In this case, even if air remains slightly, any trouble is not given provided that the oxygen concentration is controlled within a range of 4 to 150 ppm. It will be noted that the oxygen concentration can be measured, for example, by galvanic cell type densitometer.

According to the treating method (2) of the present invention, corona discharge may be processed at an atmospheric pressure without any specific conditions except that the procedure has to take place under the above-mentioned atmosphere where the oxygen concentration is very low.

According to the surface-treating method (2), the treated fluorine resin is imparted with bonding property to a crosslinking elastic adhesive body and also with storage stability, so that the treating method of a fluorine resin according to the invention can be conveniently adopted as a surface-treating method of a fluorine resin employed as a pretreatment upon bonding of a crosslinking elastic adhesive body with a fluorine resin.

Furthermore, the surface-treating method of a fluorine resin of (3) is a treating method of a fluorine resin to be strongly bonded to a crosslinking elastic adhesive body and also a surface-treating method including a combination of a corona discharge treatment and a thermal treatment.

The surface-treating method of (3) comprises subjecting a fluorine resin to a corona discharge treatment wherein the corona discharge treatment is effected by use of air, not a nitrogen gas, and an ordinary corona treating apparatus that is used for treatment in air can be employed as it is.

For performing corona discharge in air, it is preferred to carry out the treatment as uniformly as possible in such a way that air is blown against a discharge port to invariably send fresh air thereto, but the method is not limited to this.

In the practice of the invention, the fluorine resin subjected to corona discharge is further thermally treated. Accordingly, the bonding property to a crosslinking elastic adhesive body described hereinlater is reliably imparted.

The thermal treating conditions of the invention are not critical, and it is recommended that a known device, such as a precise oven, a drying furnace, an IR lamp or the like, is used for treatment at 80 to 300° C., preferably 100 to 180° C., for a time of 5 to 60 minutes, preferably 10 to 30 minutes.

As described hereinabove, the fluorine resin treated according to the method (3) of the invention is improved in the property of bonding to a crosslinking elastic adhesive body, and the corona treatment is carried out by use of air, and can thus be performed inexpensively.

As set out above, the surface-treating methods (1) to (3) of a fluorine resin according to the invention are able to reliably impart, to the treated fluorine resin, the property of strong bonding to a crosslinking elastic adhesive body. Accordingly, these methods can be conveniently adopted as a surface-treating method of a fluorine resin for pretreatment in bonding of a crosslinking elastic adhesive body to obtain a laminate, which is used as a window material of buildings or the like or an outdoor electric member.

Next, a method for making a laminate for achieving the first object of the invention comprises subjecting a desired type of fluorine resin to one of fluorine resin surface-treating methods (1) to (3) and directly bonding a crosslinking elastic adhesive body to the resultant fluorine resin.

To obtain the crosslinking adhesive body, there is beneficially used an ethylene-vinyl acetate copolymer composition, in which there is conveniently used one having a vinyl acetate content ranging from 5 to 50 wt %, preferably from 10 to 45 wt %.

Where the copolymer composition is used as a sealing material, it may be used in the form of a sheet. It is preferred that after attachment to a fluorine resin, the copolymer composition is crosslinked and integrally formed of the fluorine resin. Accordingly, the crosslinking elastic adhesive body composition includes a thermal and/or photocurable crosslinking elastic adhesive body composition formulated with an organic peroxide and/or a photosensitizer. The composition may be formulated, from the standpoint of bonding property with an acryloxy group-containing compound, a metharyloxy group-containing compound, an allyl group-containing compound, a silane coupling, an epoxy group-containing compound, a hydrocarbon resin or the like.

For instance, for the thermal curing of the ethylene-vinyl acetate copolymer, an organic peroxide may be added to. The organic peroxide may be any ones provided that they are able to decompose at a temperature of 70° C. or over and generate radicals. Preferably, those compounds having a half-life period of 10 hours and a decomposition temperature of 50° C. or over are used.

Usable organic peroxides include, for example, 2,5-dimethylhexane-2,5-dihydro peroxide, 2,5-dimethyl-2,5-di(t-butyl peroxy)hexyne-3, di-t-butyl peroxide, t-butylcumyl peroxide, 2,5-dimethyl-2,5-di(t-butyl peroxy)hexane, dicumyl peroxide, α,α'-bis(t-butyl peroxyisopropyl)benzene, n-butyl-4,4'-bis(t-butyl peroxy)valerate, 1,1-bis(t-butyl peroxy)cyclohexane, 1,1-bis(t-butyl peroxy)-3,3,5-trimethylcyclohexane, t-butyl peroxybenzoate, t-butyl peroxyacetate, methyl ethyl ketone peroxide, 2,5-dimethylhexyl-2,5-bisperoxybenzoate, butyl hydroperoxide, p-methane hydroperoxide, p-chlorobenzoyl peroxide, t-butyl peroxyisobutyrate, hydroxyheptyl peroxide, chlorohexanone peroxide, octanoyl peroxide, decanoyl peroxide, lauroyl peroxide, cumyl peroxyoctoate, succinic acid peroxide, acetyl peroxide t-butyl peroxy(2-ethylhexanoate), m-toluoyl peroxide, benzoyl peroxide, 2,4-dichlorobenoyl peroxide and the like. These may be used singly or in admixture of two or more. In general, the peroxide is used in an amount of 0.1 to 10 parts by weight per 100 parts by weight of the copolymer.

When a photosensitizer is added for photopolymerization of an ethylene-vinyl acetate copolymer, it is preferred to use a radical photopolymerization initiator as the photosensitizer. Among radical photopolymerization initiators, there are mentioned, as a hydrogen-withdrawal-type photopolymerization initiator, such as, for example, benzophenone, methyl orthobenzoylbenzoate, 4-benzoyl-4'-methyldiphenyl sulfide, isopropylthioxanthone, diethylthioxanthone, ethyl-4-(diethylamino)-benzoate and the like. There are mentioned, as an intramolecular cleavage-type initiator, benzoin ether, benzyl dimethyl ketal and the like, as an α-hydroxyalkylphenone type initiator, 2-hydroxy-2-methyl-1-phenyl-propan-1-on, 1-hydroxycyclohexyl phenyl ketone, an alkylphenyl glyoxylate, diethoxy acetophenone, and the like, and as an α-aminoalkylphenone type initiator, 2-methyl-1-[4-(methylthio)phenyl]-2-morpholinopropane-1,2-benzyl-2-dimethylamino-1-(4-morpholinophenyl)-butanon-1 and the like. Alternatively, acylphosphine oxide may also be used. These may be used singly or in admixture of two or more as the photosensitizer. The amount ranges from 0.1 to 10 parts by weight per 100 parts by weight of the copolymer.

Aside from the photosensitizer, organic peroxides may be further formulated, if necessary, by which thermal curing may be used in combination with photocuring.

Moreover, as set forth hereinabove, at least one of an acryloxy group-containing compound, a methacryloxy group-containing compound and an allyl group-containing compound may be added to the copolymer. Examples of the acryloxy and methacryloxy group-containing compounds used for this purpose include acrylic acid or methacrylic acid derivatives, e.g. esters of the acids. The alcoholic residues of the esters include, aside from an alkyl group having from 1 to 24 carbon atoms, preferably from 1 to 18 carbon atoms, e.g. a methyl group, an ethyl group, a dodecyl group, a stearyl group and a lauryl group, a cycloalkyl group having from 3 to 6 carbon atoms, e.g. a cyclohexyl group, substituted alkyl groups (whose alkyl moiety has from 1 to 24 carbon atoms, preferably from 1 to 18 carbon atoms) including halogen-substituted, hydroxyl group-substituted and amino group-substituted alkyl groups such as a tetrahydrofurfuryl group, an aminoethyl group, a 2-hydroxyethyl group, a 3-hydroxypropyl group, a 3-chloro-2-hydroxypropyl group and the like, and glycidyl groups. Moreover, there may be likewise used esters with polyfunctional alcohols such as ethylene glycol, triethylene glycol, polyethylene glycol and the like.

The allyl group-containing compounds include, for example, diallyl phthalate, diallyl fumarate, diallyl cyanurate, triallyl isocyanurate, triallyl cyanurate and the like.

These compounds may be used on their own or in admixture of two or more, and the amount is sufficient to be 50 parts by weight or below per 100 parts by weight of the copolymer and is generally in the range of 0.1 to 50 parts by weight, preferably from 0.5 to 20 parts by weight.

For the purpose of improving the quality of the resin, a silane coupling agent may be formulated. The silane coupling agents used for this purpose may be known ones including, for example, γ-chloropropyltrimethoxysilane, vinyltrichlorosilane, vinyl triethoxysilane, vinyl tris(β-methoxyethoxy)silane, γ-methacryloxypropyltrimethoxysilane, β-(3,4-epoxycyclohexyl)ethyltrimethoxysilane, γ-glycidoxypropyltrimethoxysilane, vinyl triacetoxysilane, γ-mercaptopropyltrimethoxysilane, γ-aminopropyltriethoxysilane, N-β-(aminoethyl)-γ-aminopropyltrimethoxysilane and the like. These silane coupling agents is generally used in an amount of 10 parts by weight or below per 100 parts by weight of the copolymer, preferably from 0.01 to 10 parts by weight, and more preferably from 0.01 to 5 parts by weight.

The crosslinking elastic adhesive body formulated with the silane coupling agent is enabled to be directly bonded to a fluorine resin subjected to the surface treatment, especially, to a fluorine resin subjected to corona discharge treatment. As will be stated hereinafter, it is preferred that to permit stronger bonding to the surface-treated fluorine resin, the formulated adhesive body is not directly bonded to the fluorine resin but is bonded, as a second crosslinking elastic adhesive layer or body, to the fluorine resin through a first crosslinking elastic adhesive layer or body formulated with little or no silane coupling agent. This will be described in more detail.

The crosslinking elastic adhesive body composition may further comprise an epoxy group-containing compound other than epoxy silane as a bonding promoter. Examples of the epoxy group-containing compound include triglycidyl-tris(2-hydroxyethylene)isocyanurate, neopentyl glycol diglycidyl ether, 1,6-hexandiol glycidyl ether, allyl glycidyl ether, 2-ethylhexyl glycidyl ether, phenyl glycidyl ether, phenol polyoxyethylene (5 moles) glycidyl ether, p-t-butylphenyl glycidyl ether, adipic acid diglycidyl adipate, glycidyl o-phthalate ester, glycidyl methacrylate, butyl glycidyl ether and the like. A similar effect may be obtained using an alloyed polymer containing an epoxy group. These epoxy group-containing compounds may be used singly or in admixture of two or more, and the amount is generally in the range of 0 to 20 parts by weight, preferably from 0.1 to 20 parts by weight, per 100 parts by weight of the copolymer.

A hydrocarbon resin may also be added to the copolymer in an amount of from 0 to 200 parts by weight, preferably from 5 to 150 parts by weight, and more preferably from 10 to 100 parts by weight, per 100 parts by weight of the copolymer. The hydrocarbon resin may be a natural resin or a synthetic resin.

For natural resins, rosins, rosin derivatives and terpene resins are preferably used. Gum resins, tall oil resins, wood resins and the like are used as the rosin. Usable rosin derivatives include those of rosins that are hydrogenated, disproportionated, polymerized, esterified, and converted to metal salts. Terpene resins include, aside from terpene resins such as α-pinene, β-pinene and the like, terpenephenol resins. As other natural resins, there may be used dammar, copal and shellac. On the other hand, synthetic resins preferably include petroleum resins, phenolic resins, xylene resins and the like. As the petroleum resin, there may be used aliphatic petroleum resins, aromatic petroleum resins, alicyclic petroleum resins, copolymerized petroleum resins, hydrogenated petroleum resins, pure monomer-based petroleum resins, coumarone-indene resins and the like. Phenol resins include alkylphenol resins, modified phenol resins and the like. Xylene resins include xylene resin, modified xylene resins and the like.

Aside from the additives mentioned above, antioxidants, dyes, processing aids, UV absorbers and the like may be further added.

The crosslinking elastic adhesive body composition can be formed as a film with a desired width and thickness by weighing predetermined amounts of the copolymer, a curing agent (organic oxide and/or photosensitizer), a silane coupling agent, an acryloxy group, methacryloxy group or allyl group-containing compound, uniformly mixing by means of a kneading machine such as a roll mill or a kneader, and subjecting to a film-forming device such as a calender roll, a T-die extruder or an inflation die.

The film thickness preferably ranges from 1 to 1000 $\mu$m, more preferably from 5 to 800 $\mu$m.

The thus film-formed composition layer is laminated with a fluorine resin, subjected to surface treatment according to one of the methods (1) to (3), according to a lamination method using, for example, a hot press to integrally combine them together. In this case, the thermal curing of an ethylene-vinyl acetate copolymer depends on the type of organic oxide and it is preferred to heat at a temperature of 70 to 170° C., preferably from 70 to 150° C., for a time of 2 to 60 minutes, preferably from 5 to 30 minutes. It is preferred from the standpoint of bonding property that curing is effected by heating under a pressure of 1 to 5000 kPa, preferably from 10 to 2000 kPa. On the other hand, with photocuring, a laminate can be cured by irradiation with UV light such as from a mercury lamp. To shorten the curing time and improve the hardness, UV light may be irradiated while preliminarily heating the laminate at 40 to 120° C.

The laminate obtained by the method of the invention is used, for example, as a window material such as of buildings or an outdoor electric member. In the case, for the fabrication of the laminate the steps other than the step of directly bonding a fluorine resin and a crosslinking elastic adhesive body can be performed in a usual manner.

Figure 1:
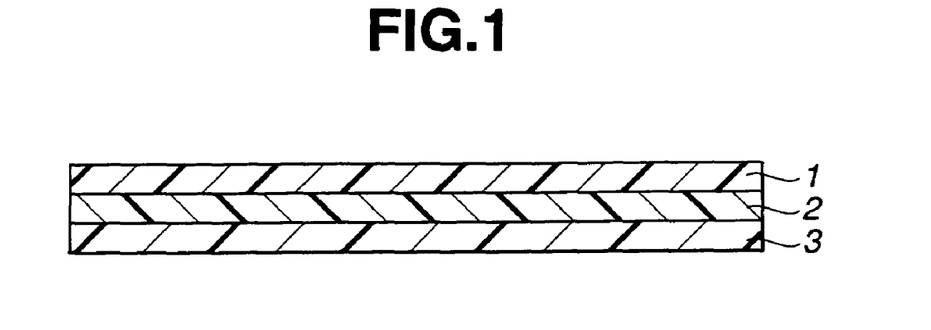
FIG. 1
FIG. 1 is a sectional view showing one embodiment of the invention.

The laminate and a method for making such a laminate for achieving the second object of the invention are described. The laminate of the invention includes, as shown in FIG. 1, at least a three-layered structure having a fluorine resin 1, a first crosslinking elastic adhesive body or layer 2 directly bonded to the fluorine resin 1 on one side thereof, and a second crosslinking elastic adhesive body 3 directly bonded to the other side of the first body or layer 2 (i.e. a three-layered structure made of one layer of a fluorine resin and two layers of a crosslinking elastic adhesive body or bodies).

The fluorine resin 1 may be any known fluorine resin, and specific examples includes those resin mentioned with respect to the embodiments for achieving the first object. Like the foregoing embodiments, an ethylene-tetrafluoroethylene copolymer is preferably used.

In the practice of the invention, the surface treatment of a fluorine resin is not critically limited and may not be carried out in some case. Especially, to enhance a bonding force, it is preferred to effect the surface treatment. The surface treating method may include any known techniques including, for example, sodium treatment, sand blast treatment, flame treatment, corona treatment, low pressure plasma treatment, sputter etching treatment, radiation irradiation treatment and the like.

The fluorine resin used in this embodiment should preferably one which undergoes a surface treatment by an ordinary corona discharge treatment or by one of those methods (1) to (3) set out hereinbefore.

The ordinary corona discharge treatment may be carried out by methods including, for example, a method wherein a gas of the type known in the art is blown against a portion where corona discharge is generated under an atmospheric pressure, and a method wherein a corona discharge port is covered with a polymer sheet or the like, and, after sealing, an intended gas is introduced from outside to substitute with an inner gas, or a combination thereof. The gas used may be nitrogen, argon, carbon dioxide, helium, tetrafluoromethane or the like, of which nitrogen gas is suitably used because of its inexpensiveness without a danger.

As the method for the surface treatment of the fluorine resin, there may be conveniently adopted the treating methods (1) to (3) used in the embodiments for achieving the first object. These methods have been set forth before and are not described again.

Once again, the laminate of the invention includes, as shown in FIG. 1, a fluorine resin 1, and at lest two crosslinking elastic bodies including a first crosslinking adhesive body 2 having a content of a silane coupling of 0 to less than 0.1 wt % and a second crosslinking elastic adhesive body 3 having a predetermined amount of a silane coupling agent wherein both crosslinking elastic adhesive bodies may be formed in a similar way except the content of the silane coupling agent.

In this case, first and second crosslinking elastic adhesive bodies are superposed such that the first layer and the second layer are successively laminated on the fluorine resin 1. The crosslinking elastic adhesive composition for the first and second layers may be each used in the form of a sheet. The first and second layers are laminated on the fluorine resin in this order and crosslinked to integrally combine with the fluorine resin.

Where the laminate of the invention is used as a sealing member, the first and second crosslinking elastic adhesive bodies may be, respectively, made of crosslinking elastic adhesive compositions formulated with the same components in similar amounts except the formulation of a silane coupling as set out in the method of making a laminate according to the embodiments for achieving the first object. Accordingly, this is not described again.

In the practice of the invention, the first crosslinking adhesive body can be appropriately made of such materials as set out hereinbefore wherein the content of a silane coupling agent should be in the range of 0 to less than 0.1 wt % and is thus substantially free of a silane coupling agent. If the content of a silane coupling agent exceeds the above rage, bonding to the surface-treated fluorine resin cannot be held strongly.

The second crosslinking elastic adhesive body of the invention should be formulated, as an essential component, with a silane coupling agent. The content in the second crosslinking elastic adhesive body is generally in the range of 0.1 to 20 wt %, preferably from 0.1 to 10 wt % and more preferably from 0.5 to 2 wt %. If the content is smaller than the defined range, the bonding force with the first adhesive body may lower. A larger content results in the bleeding of the silane coupling agent on the adhesive body surface, so that storage stability may lower.

The silane coupling agents may be ones known in the art and include, for example, those silane coupling agents used in the method for making a laminate in the foregoing embodiments for achieving the first object.

To obtain the crosslinking elastic adhesive body of the invention, such materials as stated before are formulated in such a way that the content of a silane coupling agent ranges from 0 to less than 0.1 part by weight for the first crosslinking elastic adhesive body, and also in such a way that a predetermined amount of a silane coupling is formulated for the second crosslinking elastic adhesive body, followed by uniform mixing in a kneading machine such as a roll mill, a kneader or the like and forming into a film with a desired width and thickness by means of a film-forming device such as a calender roll, a T-die extruder or an inflation.

The film thickness should preferably range 1 to 1000 μm, more preferably from 5 to 800 μm for each of the first and second crosslinking elastic adhesive bodies.

The thus film-formed crosslinking elastic adhesive body layers are laminated with a fluorine resin, particularly, to a corona discharge-treated fluorine according to a lamination method using, for example, a hot press to combine them together in the order of the first and second crosslinking elastic adhesive bodies, or all are laminated for integral combination. In this case, for the thermal curing of the ethylene-vinyl acetate copolymer, the curing is carried out by heating generally within a temperature range of 70 to 170° C., preferably 70 to 150° C. generally for 2 to 60 minutes, preferably 5 to 30 minutes although depending on the type of organic peroxide used. It is preferred from the standpoint of bonding property to heat at a compression pressure of 1 to 5000 kPa, preferably from 10 to 2000 kPa. On the other hand, with photocuring, curing may be effected by irradiation of the laminate with UV light such as from a mercury lamp. To shorten the curing time and improve the hardness, UV light may be irradiated while preliminarily heating the laminate to 40 to 120° C.

The laminate of the invention is employed, for example, as a window material of buildings and the like, and an outdoor electric member. The laminate can be made by a usual method except the step of direct bonding between the fluorine resin and the crosslinking elastic adhesive bodies.

The laminate of this embodiment for achieving the second object of the invention has a fluorine resin and a crosslinking elastic adhesive body strongly bonded together and is imparted with bonding properties that are excellent both in initial bonding force and storage stability. Thus, the laminate is usable as having wide utility in the fields of a window material such as of buildings and an outdoor electric member and the like. When using the method of making a laminate according to the embodiment for achieving the second object of the invention, there can be reliably made a laminate, which is excellent in bonding properties and storage stability.

EXAMPLE

The invention is more particularly described by way of examples, which should not be construed as limitation thereof. Comparative examples are also described.

Examples 1, 2 and Comparative Example 1

The following ethylene-tetrafluoroethylene copolymer film (with a thickness of 100 μm) was provided as a fluorine resin film and subjected to corona discharge treatment according to the following procedure, followed by measurement of an energy density and absorbance determined by iodometry. For comparison, the above procedure was repeated for similar measurements except that the fluorine resin film was not subjected to corona discharge treatment but was thermally treated in the same manner as the copolymer film. The measurements are shown in Table 1.

Fluorine Resin Film

Neoflon ETFE EF-0100, made by Daikin Ind. Co., Ltd.

Corona Discharge Treatment

The discharge electrodes (with a width of 30 cm) of a corona discharge device were covered with an acrylic resin container, under which while a nitrogen gas was passed at a rate of 10 liters/minute at an atmospheric pressure, the treatment was carried out by use of a power supply of Model HV05-2, made by Tantec Inc., at a corona output of 250 W at a film feed rate of 1 mm/minute.

Absorbance

A solution for absorbance analysis was prepared in the following manner. Sodium iodide was added to a mixed solution of 40 ml of benzene, 60 ml of 2-propanol and 1 ppm of iron chloride to saturation.

The thus treated or non-treated fluorine resin film was immersed at one side thereof with an area of 100 cm$^2$ in 10 ml of the mixed solution, kept for 10 minutes at 60° C., followed by quick addition of 1 ml of water to stop the reaction. During the course of the immersion, I$^-$ was oxidized into I$_3^-$ by means of radical generating functional groups including a peroxide.

The solution that was obtained through the above procedure was transferred to a quartz glass cell with a light path length of 10 mm, and an absorbance at 360 nm, which was an absorption wavelength of I$_3^-$, was measured by use of a spectrophotometer Model U-4000, made by Hitachi Ltd.

Next, the thus corona discharge-treated fluorine resin film and corona discharge-non-treated fluorine resin film were, respectively, laminated with a film (500 μm) of an ethylene-vinyl acetate copolymer composition having the following formulation. A 100 μm thick polyester film was laminated on a side of the ethylene-vinyl acetate copolymer composition film opposite to the side laminated with the fluorine resin, followed by hot pressing at 150° C. for 15 minutes at 1000 kPa to cure the film and integrally combine them together.

| Ethylene-vinyl acetate copolymer composition | |
|---|---|
| Ultracene 634* | 100 parts by weight |
| Triallyl isocyanurate | 2 |
| γ-Methacryloxypropyltrimethoxysilane | 0.5 |
| 1,1-Bis(t-butyl peroxy) 3,3,5-trimethylcyclohexane | 2 |

*Ultracene 634: ethylene-vinyl acetate resin having a vinyl acetate content of 26 wt %, made by Toso Corp.

The thus obtained respective laminates were checked with respect to bonding force by means of Autograph (AGS-100D), made by Shimadzu Corporation. The results are shown in Table 1.

TABLE 1

| | Energy density (kJ/m$^2$) | Amount of radical-generating functional groups (Absorbance/100 cm$^2$) | Bonding force (N/25 mm) |
|---|---|---|---|
| Comparative Example 1 | 0 | 0 | 0 |
| Example 1 | 27 | 0.033 | 50 |
| Example 2 | 50 | 0.047 | 53 |

Examples 3 to 7 and Comparative Examples 2 to 4

The following ethylene-tetrafluoroethylene copolymer film (100 μm in thickness) was provided as a fluorine resin film and subjected to corona discharge treatment according to the following procedure.

Fluorine Resin Film

Neoflon ETFE EF-0100, made by Daikin Ind. Co., Ltd.

Corona Discharge Treatment

The discharge electrodes (with a width of 30 cm) of a corona discharge device were covered with an acrylic resin container, under which while a nitrogen gas was passed at a rate of 10 liters/minute, the concentration of an oxygen gas in the container was controlled at levels indicated in Table 1. The treatment was carried out by use of a power supply of Model HV05-2, made by Tantec Inc., at a corona output of 250 W at a film feed rate of 1 mm/minute.

Next, the thus corona discharge-treated fluorine resin films were, respectively, laminated with a film (500 μm) of an ethylene-vinyl acetate copolymer composition having the following formulation. A 100 μm thick polyester film was laminated on a side of the ethylene-vinyl acetate copolymer composition film opposite to the side laminated with the fluorine resin, followed by hot pressing at 150° C. for 15 minutes at 1000 kPa to cure the film and integrally combine them together.

| Ethylene-vinyl acetate copolymer composition | |
|---|---|
| Ultracene 634* | 100 parts by weight |
| Triallyl isocyanurate | 2 |
| γ-Methacryloxypropyltrimethoxysilane | 0.5 |
| 1,1-Bis(t-butyl peroxy) 3,3,5-trimethylcyclohexane | 2 |

*Ultracene 634: ethylene-vinyl acetate resin having a vinyl acetate content of 26 wt %, made by Toso Corp.

The resultant laminates were each subjected to measurement of a bonding force, as an initial bonding force, by means of Autograph (AGS-100D), made by Shimadzu Corporation. On the other hand, the laminates made by the above method were stored over one month under the same conditions and their bonding force was measured in a similar manner to calculate, as storage stability, a ratio of the bonding force after passage one month to the initial bonding force. In this case, the storage stability of 80% or over was judged as acceptable or ○, and a lower value was judged as X. The results are shown in Table 2. For comparison, laminates were made in the same manner as described above except that the concentration of oxygen at the time of the corona treatment of the fluorine resin film was outside the range of the invention. The laminates were measured and evaluated with respect to the initial bonding force and bonding force after one month. The results are also shown in Table 2.

TABLE 2

| | Oxygen concentration (ppm) | Initial bonding force (N/25 mm) | Bonding force after one month (N/25 mm) | Storage stability (%) | Judgment |
|---|---|---|---|---|---|
| Comparative Example 2 | 2 | 54 | 39 | 72 | X |
| Example 3 | 4 | 52 | 43 | 83 | ○ |

TABLE 2-continued

| | Oxygen concentration (ppm) | Initial bonding force (N/25 mm) | Bonding force after one month (N/25 mm) | Storage stability (%) | Judgment |
|---|---|---|---|---|---|
| Example 4 | 9 | 51 | 43 | 84 | ○ |
| Example 5 | 28 | 54 | 44 | 81 | ○ |
| Example 6 | 35 | 53 | 46 | 87 | ○ |
| Example 7 | 134 | 43 | 35 | 81 | ○ |
| Comparative Example 3 | 460 | 42 | 29 | 69 | X |
| Comparative Example 4 | 20%* | 15 | — | — | X |

*: The content of oxygen in the device was set at 20% by volume.

Example 8 and Comparative Example 5

The following ethylene-tetrafluoroethylene copolymer film (100 μm in thickness) was provided as a fluorine resin film and, after corona discharge treatment by the following method, was thermally treated.

Fluorine Resin Film

Neoflon ETFE EF-0100, made by Daikin Ind. Co., Ltd.

Corona Discharge Treatment

The discharge electrodes (with a width of 30 cm) of a corona discharge device were covered with an acrylic resin container, under which air was passed at a rate of 10 liters/minute at an atmospheric pressure. The treatment was carried out by use of a power supply of Model HV05-2, made by Tantec Inc., at a corona output of 250 W at a film feed rate of 1 mm/minute.

Thermal Treatment

A fine oven (DF-61) serving as a thermal treating device and made by Yamato Science Co., Ltd., was used to thermally treat the corona-discharged ETFE at 150° C. for 30 minutes.

Next, an ethylene-vinyl acetate copolymer composition film (500 μm in thickness) was laminated to the thus corona discharged fluorine resin film, and a 100 μm thick polyester film was further laminated to a side of the ethylene-vinyl acetate copolymer composition film opposite to the side laminated with the fluorine resin film. Thereafter, the film was cured by means of a hot press at 150° C. for 15 minutes at a compression pressure of 1000 kPa to make an integral combination.

| Ethylene-vinyl acetate copolymer composition | |
|---|---|
| Ultracene 634* | 100 parts by weight |
| Triallyl isocyanurate | 2 |
| γ-Methacryloxypropyltrimethoxysilane | 0.5 |
| 1,1-Bis(t-butyl peroxy) 3,3,5-trimethylcyclohexane | 2 |

*Ultracene 634: ethylene-vinyl acetate resin having a vinyl acetate content of 26 wt %, made by Toso Corp.

The resultant laminate was subjected to measurement of bonding force by use of Autograph (AGS-100D), made by Shimadzu Ltd. The results are shown in Table 3. For comparison, a laminate was made in the same manner as set out above except that the fluorine resin was subjected to corona treatment in air but was not thermally treated, followed by measurement of bonding force. The results are also shown in Table 3.

TABLE 3

| | Thermal treating time (minutes) | Bonding force (N/25 mm) |
|---|---|---|
| Example 8 | 30 | 41 |
| Comparative Example 5 | 0 | 3 |

Example 9 and Comparative Example 6

The following ethylene-tetrafluoroethylene copolymer film (100 μm in thickness) was provided as a fluorine resin film and subjected to corona discharge treatment in the following manner.

Fluorine Resin Film

Neoflon ETFE EF-0100, made by Daikin Ind. Co., Ltd.

Corona Discharge Treatment

The discharge electrodes (with a width of 30 cm) of a corona discharge device were covered with an acrylic resin container, under which while a nitrogen gas was passed at a rate of 10 liters/minute at an atmospheric pressure, the treatment was carried out by use of a power supply of Model HV05-2, made by Tantec Inc., at a corona output of 250 W at a film feed rate of 1 mm/minute.

Figure 2:
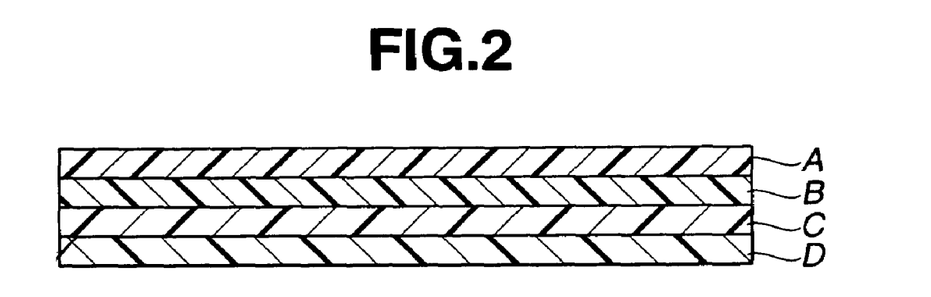
FIG. 2
FIG. 2 is a sectional view showing laminate 1 used in Example of the invention.
Figure 3:
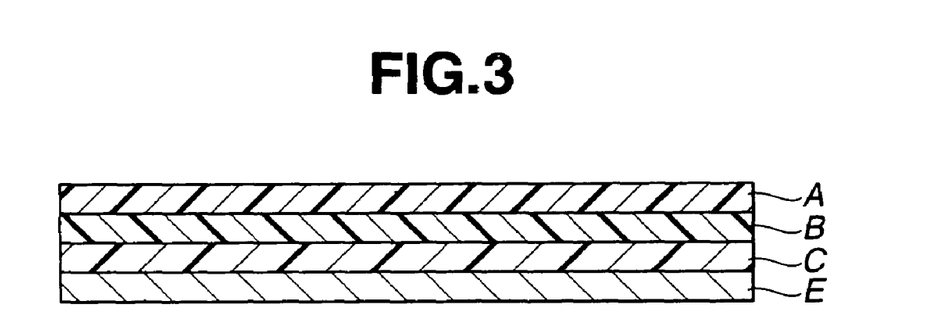
FIG. 3
FIG. 3 is a sectional view showing laminate 2 used in Example of the invention.
Figure 4:
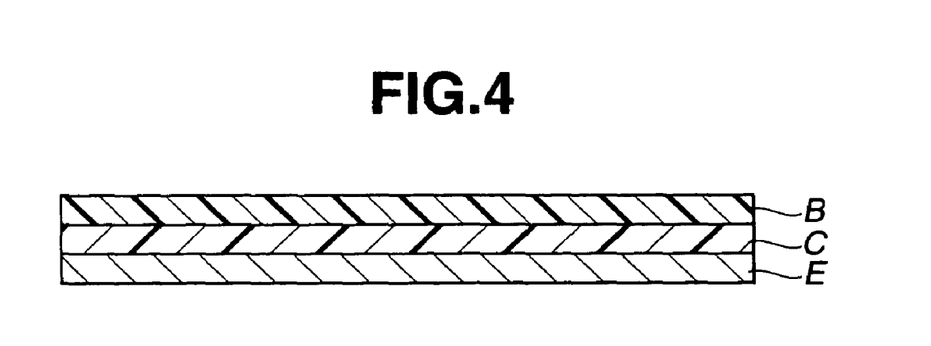
FIG. 4
FIG. 4 is a sectional view showing laminate 3 used in Example of the invention.

Next, crosslinking elastic adhesive bodies were obtained from a composition of the following formulation to have three types of a builtup layer arrangements shown in Table 4 and FIGS. 2 to 4. The amounts of a silane coupling agent in the crosslinking elastic adhesive bodies are shown in Table 4.

Crosslinking Elastic Adhesive Body Composition

| (Ethylene-vinyl acetate copolymer composition) | |
|---|---|
| Ultracene 634* | 100 parts by weight |
| Triallyl isocyanurate | 2 |
| 1,1-Bis(t-butyl peroxy) 3,3,5-trimethylcyclohexane | 2 |

*Ultracene 634: ethylene-vinyl acetate resin having a vinyl acetate content of 26 wt %, made by Toso Corp.

Figure 5:
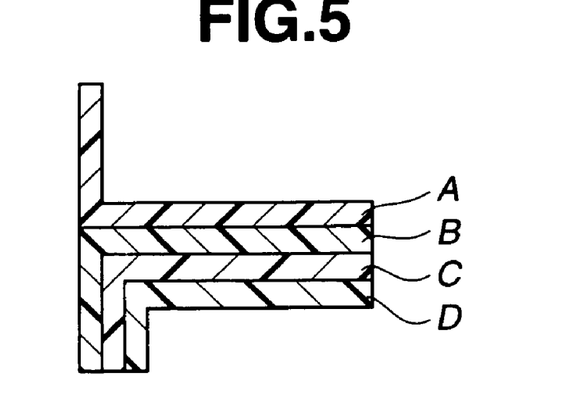
FIG. 5
FIG. 5 is an illustrative view showing a peeling test of laminate 1.

Laminate 1 (FIGS. 2 and 5)

Crosslinking elastic adhesive body B was laminated, at one side thereof, on the corona discharged fluorine resin film A, and crosslinking elastic adhesive body C was laminated on other side of B. Moreover, 100 μm thick polyester film D was laminated on a side of crosslinking elastic adhesive body C opposite to the side laminated with B thereby providing a sample for evaluation of bonding.

Figure 6:
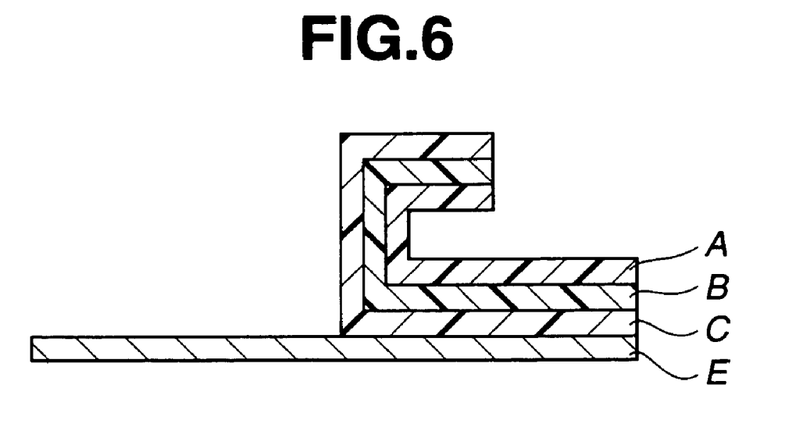
FIG. 6
FIG. 6 is an illustrative view showing a peeling test of laminate 2.

Laminate 2 (FIGS. 3 and 6)

Crosslinking elastic adhesive body B and crosslinking elastic adhesive body C were, respectively, laminated on the corona discharged fluorine resin film A in the same manner as with the laminate 1, followed by lamination of baked-finish stainless steel sheet E was laminated on a side of crosslinking elastic adhesive body C opposite to the side laminated with B, thereby providing a sample for evaluation of bonding.

Laminate 3 (FIGS. 4 and 7): Reference

Figure 7:
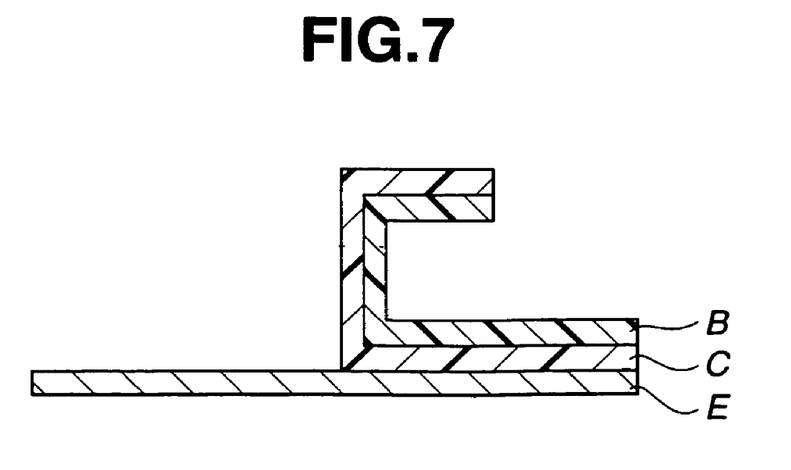
FIG. 7
FIG. 7 is an illustrative view showing a peeling test of laminate 3.

One side of crosslinking elastic adhesive body B was rendered non-adhesive, and one side of crosslinking elastic adhesive body C was laminated only on the other side of B, followed by further lamination of baked-finish stainless steel sheet E on the other side of crosslinking elastic adhesive body C, thereby providing a sample for evaluation of bonding.

The laminates 1 to 3 were, respectively, hot-pressed at 150° C. for 15 minutes at a compression pressure of 1000 kPa to cure the crosslinking elastic adhesive bodies and make integral combinations, thereby completing laminates, respectively.

The bonding force of the resultant laminates was measured by use of Autograph (AGS-100D, made by Shimadzu Ltd.).

Laminate 1 was evaluated by T-peel as shown in FIG. 5. The bonding forces of laminates 2 and 3 was evaluated by 180° peeling as shown in FIGS. 6, 7, respectively. The peeling test of the respective laminates was carried out under conditions of a pulling rate of 50 mm/minute and room temperature (23° C.±1° C.).

The judging standards of the peel samples were determined in the following manner because the samples had different arrangements, respectively. An acceptable level of "○" was set at 50 N/25 mm or over for laminate 1, at 70 N/25 mm or over for laminate 2 and at 30 N/25 mm or over for laminate 3, and lower levels were judged as "X". The results are shown in Table 4. For comparison, the bonding force of the case where the amounts of a coupling agent in crosslinking elastic adhesive bodies B, C were different from those of the invention was measured and evaluated in the same manner as in the example. The results are shown in Table 4.

TABLE 4

| | Amount of silane coupling agent (wt %) | | Initial bonding force (N/25 mm) and evaluation | | |
|---|---|---|---|---|---|
| | Cross-linking elastic adhesive body B | Cross-Linking Elastic adhesive body A | Laminate 1 | Laminate 2 | Laminate 3* |
| Example 9 | 0 | 1 | 53 ○ | 76 ○ | 32 ○ |
| Comparative Example 6 | 0 | 0 | 51 ○ | 37 X | 23 X |

*The bonding force and evaluation of laminate 3 were provided as reference for evaluating the property of bonding between crosslinking elastic adhesive body C and stainless steel sheet E.

Experimental Examples 1, 2

The property of bonding between a corona discharged fluorine resin and a crosslinked elastic adhesive body directly laminated thereon was tested in the following manner.

Crosslinking elastic adhesive body compositions B, C as used in Example 9 were, respectively, used and formulated with a silane coupling agent as shown in Table 4, followed by lamination on the corona discharged fluorine resin in the same manner as in the example to obtain laminates each having a double-layered structure including one fluorine resin layer and one crosslinking elastic adhesive body layer.

The resultant laminates were each checked with respect to initial bonding force and bonding force after one month. The ratio of the bonding force after one month to the initial bonding force was calculated as storage stability. The ratio of 50% or over, which was considered to keep a good bonding force, was assessed as ○, and the ratio less than 50%, which was considered to be poor in bonding force was evaluated as X. The results are shown in Table 5.

TABLE 5

|  | Content of silane coupling agent (wt %) | Bonding force (N/25 mm) | | | Judgement |
|---|---|---|---|---|---|
|  |  | Initial bonding force | After one month | Storage stability (%) |  |
| Experimental Example 1 | 0 | 56 | 53 | 89 | ○ |
| Experimental Example 2 | 2.0 | 45 | 15 | 33 | X |

Thus, according to the invention, the fluorine resin can be treated on the surface thereof so that the surface is directly, strongly bonded to a crosslinking elastic adhesive body, with the result that there can be reliably made a laminate that is excellent in bonding property and storage stability. The laminate has wide utility in the fields of a window material such as buildings and an outdoor electric member wherein the fluorine resin and the crosslinking elastic adhesive body are strongly bonded together.

We claim:

1. A surface-treating method for a fluorine resin comprising subjecting a fluorine resin to surface treatment, producing radical-generating functional groups on the surface of the treated fluorine resin, and measuring absorbance by iodometry so that an absorbance at 360 nm is $0.02/100$ cm$^2$ or over.

2. A surface-treating method of a fluorine resin according to claim 1, wherein the absorbance is $0.03/100$ cm$^2$ or over.

3. A surface-treating method of a fluorine resin according to claim 1, wherein the fluorine resin consists of an ethylene-tetrafluoroethylene copolymer.

4. A method for making a laminate wherein a fluorine resin and a crosslinking elastic adhesive body are directly bonded together, which method comprising laminating the crosslinking elastic adhesive body to a fluorine resin surface, which has been treated according to the following method (1):

the fluorine resin is subjected to surface treatment, producing radical-generating functional groups on the surface of the treated fluorine resin, and measuring absorbance by iodometry so the absorbance at 360 nm is $0.02/100$ cm$^2$ or over.

* * * * *